United States Patent Office 3,068,217
Patented Dec. 11, 1962

3,068,217
PROCESS FOR POLYMERIZING DIOLEFINS IN THE PRESENCE OF ALLENE OR DIMETHYL ACETYLENE
Thair L. Higgins, El Cerrito, and Charles H. Wilcoxen, Jr., San Lorenzo, Calif., assignors to Shell Oil Company, a corporation of Delaware
No Drawing. Filed Oct. 23, 1959, Ser. No. 848,216
8 Claims. (Cl. 260—94.3)

This invention relates to the polymerization of diolefins. More particularly, the invention relates to an improved process for polymerizing conjugated diolefins using certain metallic catalysts.

Specifically, the invention provides a new and improved process for polymerizing conjugated diolefins with certain metallic catalysts which gives products having a high cis 1,4 structure and improved processing properties. The process comprises contacting the conjugated diolefin in non-aqueous solution with a divalent nickel or cobalt compound, preferably with a metal salt of the group consisting of divalent cobalt and nickel halides or nitrates in combination with organo aluminum compounds, to produce polymers of high cis 1,4 structure and controlling the molecular weight of the resulting polymer by adjusting the amount of dimethylacetylene and/or allene contained in the polymerization mixture.

It has been found that polybutadienes having high cis 1,4 structure can be cured to form rubber products having outstanding physical properties, such as excellent resiliency, particularly at lower temperature, good abrasion resistance and the like. Polymers having a high cis 1,4 content can be obtained by polymerizing the butadiene in a non-aqueous system in the presence of nickel or cobalt halides. The polymers prepared by the method, however, are rather difficult to mill due to their high molecular weights. Efforts have been employed to produce lower molecular weights by conventional techniques but such methods have failed either because there was little or no effect on molecular weight or the modification changed the stereospecific nature of the polymer so as to cause a loss of many desired properties.

The measurement generally employed as an indication of the molecular weight of these polymers is the "intrinsic viscosity" (IV) expressed in deciliters per gram (dl./g.). The intrinsic viscosity of polybutadiene produced with the above-mentioned catalyst systems in the absence of a reaction-modifying agent is usually in the range from 5.5 to 9 dl./g. or higher, determined in toluene at 25° C. For many uses it is necessary to have IV values in the range from 1 to 5 dl./g.

Accordingly, it is an object of the invention to provide a new process for polymerizing diolefins. It is a further object to provide a new process for preparing polymers of conjugated diolefins that have a high cis 1,4 structure. It is a further object to provide a process for preparing polymers of conjugated diolefins having a high cis 1,4 structure and better milling properties. It is a further object to provide new polymers of butadiene having very high cis 1,4 structure and intrinsic viscosities between 1.0 and 5.0 and preferably between 1.0 and 3.0. These and other objects of the invention will be apparent from the following detailed description thereof.

It has now been discovered that these and other objects may be accomplished by the process of the invention which comprises contacting the conjugated diolefin with a compound of divalent nickel or cobalt, preferably a metal salt of the group consisting of divalent nickel and cobalt halides and nitrates, most preferably in combination with an organo aluminum compound and/or an acidic metal halide in the presence of a controlled proportion of dimethylacetylene and/or allene in the polymerization mixture. It has been found that by the use of this special process one is able to obtain polymers of the conjugated diolefins which have high cis 1,4 structure and at the same time much better milling properties. For example, with the above process one is now able to obtain polymers of butadiene having a cis 1,4 content of above 96% and intrinsic viscosities varying from about 1.0 to 5.0. Prior polymers of this type having the poor milling properties, on the other hand, had intrinsic viscosities between 5.5 and 7 or higher.

It has also been found that the process provides a good means for preparing polymers of predetermined molecular weight. By controlling the amount of the dimethylacetylene and/or allene one can produce polymers having any desired intrinsic viscosities between the limits of about 1.0 and 5.0 dl./g. or higher.

It was unexpected to find that the above-noted products could be obtained by this method because in the original work done with the above-described catalysts in the production of polyolefins of high cis 1,4 content it was found that the reactions are extremely sensitive to the presence of small amounts of impurities. Accordingly, it was determined that such polymerizations should be conducted in the absence of impurities because it appeared that the impurities either consume the catalyst or somehow participate in the polymerization to produce less desirable products. As a rule, technical grades of polyolefins inevitably contain substantial amounts of impurities by reason of their methods of preparation or recovery. The impurities may include allene and acetylenic hydrocarbons which may include dimethylacetylene. For example, in the case of isoprene which is prepared by dehydrogenation of branched pentenes there may be varying amounts of unsaturated compounds such as acetylene, dimethylacetylene, allene and the like present as well as oxygen and/or sulfur containing impurities. In the case of butadiene which is prepared by the dehydrogenation of butenes, acetylenic hydrocarbons may be present. The practice, then, is to treat these monomers in order to remove the impurities. The treatment may take any of several forms as, for example, the use of purification trains wherein the monomer is treated with a plurality of materials to remove harmful impurities. For example, water and water vapor may be removed by passing the monomer through a dehydrating agent such as silica gel. Various metal hydrides such as calcium hydride may be used to remove water and other impurities. Molecular sieves may be used to selectively adsorb unbranched hydrocarbons and highly polar compounds, e.g., in the production of isoprene. Diolefin feeds may be selectively hydrogenated to remove allene and acetylenic impurities. As a practical matter, therefore, the diolefinic monomers polymerized according to the known methods of utilizing the present catalysts are in a highly purified state and no longer contain the concentrations of acetylenic compounds and/or allene which may have originally been present in the crude technical diolefin.

In preparing the diolefin feed for the polymerization processes of this invention any of several techniques may be employed. If desired, the diolefin which is to be polymerized may be first treated by known means to substantially remove the acetylenic hydrocarbons and allene which may be present. Thereafter a measured amount of dimethylacetylene or allen or a mixture of both is added to the diolefin which is to be polymerized. If desired, the dimethylacetylene, allen or mixture may instead be added to the solvent or any other component which is normally employed in the polymerization process. It is preferred to add dimethylacetylene, allene or mixture to the diolefin before it comes in contact with the catalyst but it is also possible to carry out the processes of this invention by adding it to the catalyst or the suspension and/or solution of the catalyst.

In an alternative method in which a diolefin feed contains more than a desired amount of dimethylacetylene and/or allene, a portion of the feed may be treated to remove substantially all acetylenic components and allene and other portions of the feed may be treated in such a manner that dimethylacetylene and/or allene remains therein and the two separate streams then mixed in the proportion to give the desired content of dimethylacetylene and/or allene.

Normally dimethylacetylene is present in crude feeds in greater proportion than is desired in the practice of the process of this invention. Acetylenic hydrocarbons may be removed from diolefin feed by conventional methods, e.g., redistilling over alkali hydroxide, and particularly by a very mild selective hydrogenation of the feed. The hydrogenation of acetylenes and typical methods for the removal of acetylenic impurities are described, for example, in G. C. Bond et al., Transactions of the Faraday Society, 651 (1952); J. Sheridan et al., Journal of the Chemical Society, 373 (1944), and 133, 305, 470 (1945); R. E. Reitmeier et al., Chemical Engineering Progress, 54, 48 (December 1958); U.S. 2,391,004 and U.S. 2,426,604. Allene may be similarly removed.

The process of the invention may be applied to the polymerization of any conjugated diolefin hydrocarbon. It is particularly useful for the polymerization of butadiene-1,3 as this conjugated diolefin is found to polymerize, according to the present invention, with ease and to produce a polymer having a very high proportion of the cis 1,4 configuration. Other conjugated diolefins may be employed, however, such as, for example, 2,3-dimethyl butadiene-1,3, 2-ethyl butadiene-1,3, isoprene, 4-methyl hexadiene-1,3, 2-methyl pentadiene-1,3, 2-isopropyl butadiene-1,3, octatriene-2,4,6, 2-amyl butadiene-1,3, piperylene and the like. Not only may any conjugated diolefin be polymerized but two or more conjugated dienes may be copolymerized to produce the desired products. A representative copolymer of this type is, for example, a copolymer of butadiene and isoprene prepared according to the present invention.

The catalysts used in the polymerization comprise dissolved compounds of divalent cobalt and nickel and preferably halides or nitrates or mixtures thereof. Examples of these include, among others, cobaltous bromide, cobaltous fluoride, cobaltous iodide, nickelous bromide, nickelous iodide, and nickelous fluoride, nickel nitrate, cobalt nitrate, cobalt naphthenate, nickel naphthenate and the like. Particularly preferred are the bromides and chlorides of cobalt and nickel. In the preferred embodiment, the salts are utilized in the purified form free of water of crystallization.

The cobalt and nickel salts may be used alone or in certain combinations with other ingredients which modify the action of the catalyst and may be designated "cocatalysts." The following combinations of ingredients provide particularly outstanding results: (a) a cobalt or nickel salt in combination with an acidic metal halide; (b) a cobalt or nickel salt in combination with an acidic metal halide and an aluminum alkyl compound; and (c) a cobalt or nickel salt in combination with an organo-aluminum compound.

Of the acidic metal halides, aluminum halides are preferred. Aluminum chloride is particularly preferred, followed by aluminum bromide and the other aluminum halides. Resublimed aluminum chloride is particularly outstanding for the production of cis 1,4 polymer of conjugated dienes but represents an unnecessarily pure form of the halide. Other acidic metal halides that may be used in this invention include those of gallium, indium, zinc and other acidic halides of non-transition metals, which the chlorides thereof being best. Acidic metal halides herein means these halides which are known as Lewis acids, as defined, for example, in "Advanced Organic Chemistry" by G. M. Wheland, John Wiley and Sons, 1949, pages 80 et seq.

The organo-aluminum compounds employed in combination (c) may be any aluminum compounds having an organo radical. However, aluminum alkyls are preferred. The aluminum alkyls useful in combinations (b) and (c) include trialkyl aluminum, alkyl aluminum halides and alkyl aluminum hydrides. Representative alkyl aluminums include those represented by the formulae $AlR_3$, $AlR_2X$ and $AlRX_2$. In these formulae, R may be the same or different alkyl radicals of 1 to 10 carbon atoms such as methyl, ethyl, propyl, isopropyl, n-butyl, isobutyl, octyl, nonyl and the like. In the preferred embodiment the R's are lower alkyls having from 1 to 4 carbon atoms, with ethyl being particularly preferred. Included are, for example, aluminum triethyl, aluminum triisopropyl, aluminum tributyl, aluminum triisobutyl, aluminum diisobutyl sesquihalide, aluminum diethyl hydride, aluminum butyl dichloride and the like. The aluminum alkyl sesquihalides are preferred and the species aluminum ethyl sesquichloride produces particularly superior results.

In the modification (a) in which the catalyst consists of a cobalt or nickel salt and an acidic metal halide the catalyst is prepared as a complex of the two ingredients. These catalysts are very simple to prepare. In essence, all that is required is that the catalyst components be mixed in a hydrocarbon diluent and the complex be permitted to form. Preferably the hydrocarbon diluent for the monomer and the catalyst preparation should be the same and accordingly benzene or benzene-containing mixtures are preferred for the catalyst preparation. The catalyst formation is hastened if the hydrocarbon diluent containing the catalyst components is refluxed for a period ranging from a few minutes to a few hours. Alternatively, the catalyst may be permitted to form from the components by merely allowing the mixture to stand for several hours. Best results are obtained when the maximum amount of the catalyst components react and go into solution in the hydrocarbon diluent. In the most preferred embodiment the catalyst components are added to the hydrocarbon diluent, the mixture is heated and thereafter the excess solids are removed by filtering, centrifuging or decanting. The catalyst is then in a soluble form which is contained in the hydrocarbon diluent. In the preferred preparations of this type of catalyst, the mol ratio of the acidic metal halide to the transition metal halide during the catalyst preparation is greater than that in the final catalyst. The preferred mol ratios in the final catalyst include a two to five fold molar excess of acidic metal halide over cobalt or nickel halide. The quantity of the complex catalyst in solution may vary from 5 to 50,000 p.p.m. of the diluent and preferably is in the order of 5 to 2,000 p.p.m.

In the preparation of the catalysts of type (b), which include cobalt or nickel salt, an acidic metal halide and an alkyl aluminum compound, the catalyst may be simply prepared by mixing the catalyst components in a hydrocarbon diluent and permitting the reaction product to form. The remarks made above with respect to the formation of a two-component catalyst also apply to the preparation of such a three-component catalyst. Another technique for the preparation of the three-component catalyst comprises proceeding as above but excluding the alkyl aluminum initially. After the two inorganic components have been heated in the hydrocarbon diluent and the solid separated, the metal-organic component, which is normally a liquid, is added to yield the reaction product. The solid fraction which is obtained on mixing the first two components need not be separated and, if desired, may remain in the catalyst but this is less preferred because it increases the amount of catalyst residue in the product without corresponding advantages. In the three-component catalyst, the mol ratio of the acidic metal halide to the transition metal halide is preferably greater during the catalyst preparation than in the final catalyst. In the preferred catalysts, the acidic metal halide is finally present in a two to five fold molar excess over the cobalt or nickel salt. The alkyl aluminum compound may be present in any amount in excess of 0 mols and supply some improvement in the reaction conditions and product. Concentrations of the three-component catalyst are in the same range as those of the two-component catalyst.

In the preparation of the two-component catalyst (c), formed from cobalt or nickel salt and an organo aluminum co-catalyst, the catalyst again may be prepared simply by combining the catalyst components in a hydrocarbon diluent. The components may be added in any order but if a catalyst is to be prepared from an aluminum trialkyl it should be aged before used. The aging may be conveniently accomplished by heating to temperatures up to the boiling point of the diluent and permitting the catalyst contained in the diluent to cool. Alternatively, aging may be accomplished by permitting the catalyst composition to stand for several hours at room temperature. In preparing the catalyst it is preferred that the mol ratio of the cobalt or nickel halide to the organo aluminum compound be greater than 1. A minimum ratio of about 1.5:1 is especially preferred. While there is no maximum which limits the operativeness of the catalyst, practical considerations establish a ratio of about 5:1 as a suitable upper limit. In the preferred embodiment the mol ratio of cobalt or nickel halide to organo aluminum compound is approximately 3:1.

In all catalyst preparations the components are preferably employed in substantially pure anhydrous form. Small concentrations of some impurities may, however, be tolerated in the catalyst components.

The catalysts may be added as such or in combination with a solid carrier, or in solvent solution. It is usually preferred to employ a solvent solution. Suitable solvents include benzene, toluene, xylene, cyclohexane, methyl cyclohexane and the like. If solvent solutions of the catalysts are employed they generally comprise from about 3% to 10% of the total polymerization mixture.

The amount of the nickel or cobalt catalyst employed may vary. In general, only small amounts, e.g., amounts ranging from about $10^{-5}$ to about 0.01 mol per mol of the conjugated diene, are very satisfactory. Larger amounts of the catalyst, e.g., 0.01 to 0.1 mol may be employed but there appears to be no substantial advantage obtained by using such larger amounts.

When using the co-catalysts with the above-described nickel or cobalt salts, the ratio of the components may vary over a considerable range. In some cases, the weight ratio of the metal salt to organo aluminum compound may vary from about 1.5:1 to about 1:1000. Preferably, the metal salt and organo aluminum compounds are utilized in weight ratios varying from about 1:5 to 1:35.

The polymerization is accomplished by contacting the monomer to be polymerized with the above-described catalysts in the presence of a controlled amount of dimethylacetylene and/or allene. Surprisingly, it has been found that, compared to an effective amount of dimethylacetylene, an equivalent amount, on a molar basis, of methylacetylene has no significant effect on the intrinsic viscosity of the product. Even relatively large amounts of methylacetylene mainly cause a lowering of the reaction rate, rather than the desired effect on the molecular weight of the product. Methylacetylene is a homolog of dimethylacetylene and an isomer of allene.

Where dimethylacetylene is the added component in accordance with this invention, the amount added is in the range from 5 to 200 parts by weight per million parts of monomer. Preferably the amount of dimethylacetylene added is from about 50 to about 150 parts per million parts by weight of monomer used. The exact amount selected will be determined by the molecular weight (as represented by intrinsic viscosity determinations) desired and the effect on conversion. The lowest molecular weights of polydiolefin are generally found at dimethylacetylene concentrations in the middle of the above-stated ranges.

Where allene is the added component in accordance with this invention, the amount added is in the range from 1 to 3,000 parts by weight per million parts of monomer. Preferably the amount of allene added is from 5 to 200 parts by weight per million parts of monomer used. The exact amount selected will be determined by the molecular weight (as represented by intrinsic viscosity determinations) desired and the effect on conversion.

The temperature employed will depend upon the exact catalyst utilized. Temperatures generally range from about 0° C. to about 100° C. Temperatures between 15° C. and 60° C. are particularly preferred as they generally give products having a higher proportion of the cis 1,4 addition product.

The process is conducted in an inert atmosphere. This is preferably accomplished by first sweeping out the reaction zone with an inert gas. Suitable inert materials include nitrogen, methane, and the like.

The process should also be conducted under substantially anhydrous conditions. This is accomplished by using anhydrous reactants and dry reaction vessels and maintaining customary precautions during the reaction to keep water out of the reaction vessel.

The most convenient operating pressure is that which is created by the system and will vary depending upon the specific nature of conjugated diene, the solvent and their respective amounts. For convenience, such pressures are termed "autogenic" pressures. If desired, higher or lower pressures may be employed.

A particularly preferred method of operation is to combine the solvent and catalyst, introduce the monomer into this mixture and then heat the combined mixture to the desired temperature. In the case of monomers, such as butadiene, it is preferred to add the catalyst to the solvent, and then introduce the dry butadiene into the solvent-catalyst mixture over a period of time. The rate of addition is preferably such that the heat of reaction is dispersed without the application of external cooling means. External cooling means may be applied if desired, however, to speed the rate of addition. In the preferred method of operation, the time required for the reaction will depend upon the rate of addition of monomer as well as the reaction temperature. At the preferred temperature of 15° C. to 60° C. with the addition of butadiene over a period of time, the polymerization can conveniently be carried out in from about 5 minutes to about 4 hours.

The reaction mixture is preferably agitated during the course of the reaction. This may be accomplished by mounting the reactor on a rocker or by use of suitable stirrers. Further, the reactor should preferably be equipped with suitable inlets for feeding the monomer and a set of inlets and outlets for circulating an inert gas to purge air from the vessel. A separate inlet may be supplied whereby catalyst may be added during the course of the reaction. If continuous operations are to be employed then the inlet for catalyst and solvent is necessary as well as an outlet for the continuous withdrawal of polymer solution.

At the completion of the reaction, the mixture is then treated with a proton donor to deactivate the metal catalyst. This includes material having active hydrogen, such as water, mineral or organic acids, mercaptans, alcohols and the like. This is preferably accomplished by addition of a small amount of isopropyl alcohol. A larger amount of the alcohol may then be added to coagulate the polymer.

The polymers prepared by the process of the invention will have a high cis 1,4 structure, e.g., at least 90% and preferably above 96% cis 1,4 structure, as determined by infrared analysis. They will preferably have intrinsic viscosities no greater than 5.0 and preferably between 1.5 and 3.0. These intrinsic viscosities are determined in toluene by conventional procedure.

The polymers prepared by the process of the invention may be utilized for a great many important industrial applications. The polymers may be used, for example, in the preparation of molded rubber articles, such as tires, belts, tubes and the like or may be added alone or with other polymeric materials to known rubber compositions to improve specific properties, such as resilience. The polymers of the invention may also be used in the preparation of impregnating and coating compositions or may be combined with asphalts, tars and the like to form surfacing compositions for roads and walkways.

In forming rubber articles from the polymers produced by the process of the invention, it is preferred to compound the polymer with the necessary ingredients, such as, for example, tackifiers, stabilizers, plasticizers, vulcanizing agents, oils, carbon black and the like, and then heating to effect vulcanization. Preferred vulcanizing agents include, among others, sulfur, sulfur chloride, sulfur thiocyanate and organic polysulfides. These agents are preferably used in amounts varying from about 0.1 part to 10 parts per 100 parts of rubber. Vulcanization temperatures preferably range from about 100° C. to about 175° C. Preferred temperatures range from about 125° C. to 175° C. for a period of 15 to 60 minutes.

To illustrate the manner in which the invention may be carried out, the following examples are given. It is to be understood, however, that the examples are for the purpose of illustration and the invention is not to be regarded as limited by any of the specific conditions cited therein. In the examples, "parts" are parts by weight, unless otherwise stated.

*Example 1*

This example illustrates the preparation of polybutadiene having a high cis 1,4 content employing an anhydrous cobaltous chloride-aluminum chloride-aluminum ethyl sesquichloride catalyst in the presence of dimethylacetylene.

46.5 parts of dry butadiene and 1,000 parts of benzene solution of catalyst containing 2 parts, 7.7 parts and 550 parts, respectively, of $CoCl_2$, $AlCl_3$ and $Al_2Cl_3(C_2H_5)_3$ per million of reaction mixture and containing 3.3 parts per million of dimethylacetylene, based on total reaction mixture, were added to a glass ampoule. Nitrogen was passed into the ampoule to remove any molecular oxygen and the ampoule then sealed and maintained at about 30° for several hours. The ampoule was then opened and 1 part of isopropyl alcohol added to kill the catalyst. The reaction mixture was then poured into isopropyl alcohol to coagulate the polybutadiene. The polymer was washed and dried. Infrared analysis indicated the polymer had the following structure: 98.3% cis-1,4, 0.9% 1,2 and 0.8% trans 1,4. Intrinsic viscosity in toluene was 3.41 dl./g.

*Example 2*

A related experiment conducted at conditions like those of Example 1 but in the complete absence of dimethylacetylene gave a product having an intrinsic viscosity in toluene of 5.7 dl./g.

*Example 3*

One hundred parts of the polybutadiene prepared in Example 1 is mixed and milled with 2 parts phenyl-beta-naphthylamine, 5 parts zinc oxide, 3 parts stearic acid, 50 parts High Abrasion Furnace Black, 1.5 parts of N-cyclohexyl-2-benzothiazole-sulfenamide and 0.2 parts of sulfur and the resulting product cured for 25 minutes at 135° C. The milling is much easier than with the higher molecular weight product produced according to Example 2. The resulting product is a hard rubbery sheet having good resiliency, which is retained even at low temperatures, and good abrasion resistance.

*Example 4*

Experiments were made in accordance with the method of Example 1, but with varying proportions of butadiene monomer and with varying proportions of dimethylacetylene (DMA).

In a series in which the butadiene content was 20% by weight of the reaction mixture, the intrinsic viscosity in the absence of DMA was 6.4; with 14 parts per million DMA (basis total mixture), the intrinsic viscosity was 4.6; with 50 parts per million DMA (basis total mixture), the intrinsic viscosity rose back to 5.1.

In experiments in which butadiene was 5% of the reaction mixture, the intrinsic viscosity of a run made in absence of DMA was 4.2 dl./g. It dropped to 3.7 when 0.3 part per million DMA was used and to 3.2 when using 6 parts per million DMA.

*Example 5*

The procedure of Example 1 is repeated, substituting for the catalyst solution thereof 1,000 parts of a benzene solution of catalyst prepared by reacting 18 parts $CoCl_2$ (anhydrous) with 9 parts aluminum triisobutyl in 300 parts benzene. The resulting polymer has a cis-1,4 content in excess of 95% and an intrinsic viscosity in toluene of the order of 3. The product is easily formed into a rubber as in Example 3.

*Example 6*

The procedure of Example 1 is repeated, substituting for the catalyst solution thereof 1,000 parts of a benzene solution of a catalyst prepared by reacting 18 parts of anhydrous nickel chloride with 9 parts of aluminum triethyl in 300 parts of benzene. Infrared analysis indicates the polymer has a cis-1,4 content about 95%. Intrinsic viscosity in toluene is less than 3. The product is easily formed into a rubber as in Example 3.

*Example 7*

The procedure of Example 1 is repeated, substituting 12 parts of dry isoprene for the butadiene.

One hundred parts of the polyisoprene prepared as above is mixed and milled with 2 parts phenyl-beta-naphthylamine, 5 parts zinc oxide, 3 parts stearic acid, 50 parts High Abrasion Furnace Black, 1.5 parts of N-cyclohexyl-2-benzothiazole-sulfenamide and 0.2 part sulfur and the product cured for 25 minutes at 135° C. The resulting product is a hard, rubbery sheet having good resiliency and good abrasion resistance.

*Example 8*

This example illustrates the preparation of polybutadiene having a high cis-1,4 content employing an anhydrous cobaltous chloride-aluminum chloride-aluminum ethyl sesquichloride catalyst in the present of allene.

To a solution of 7 parts of dry butadiene and 93 parts of benzene containing 42 parts per million allene, there was added a sufficient amount of a solution of a catalyst to give concentrations of 2 parts, 7 parts and 175 parts, respectively, of $CoCl_2$, $AlCl_3$ and $Al_2Cl_3(C_2H_5)_3$ per million of reaction mixture. The solutions were mixed in a glass ampoule. Nitrogen was passed into the ampoule to remove any molecular oxygen and the ampoule then sealed and maintained at about 30° C. for several hours. The ampoule was then opened and 1 part of isopropyl alcohol added to kill the catalyst. The reaction mixture was then poured into isopropyl alcohol to coagulate the polybutadiene. The polymer was washed and dried. Infrared analysis indicated that the polymer had the following structure: 96.9% cis-1,4, 1.5% 1,2 and 1.6% trans 1,4. Intrinsic viscosity in toluene was 1.64 dl./g.

Example 9

A related experiment conducted at conditions like those of Example 8 but in the complete absence of allene gave a product having intrinsic viscosity in toluene of about 2.6 dl./g.

Example 10

One hundred parts of the polybutadiene prepared in Example 8 is mixed and milled with 2 parts phenyl-beta-naphthylamine, 5 parts zinc oxide, 3 parts stearic acid, 50 parts High Abrasion Furnace Black, 1.5 parts of N-cyclohexyl-2-benzothiazole-sulfenamide and 0.2 part of sulfur and the resulting product cured for 25 minutes at 135° C. The milling is much easier than with the higher molecular weight product produced according to Example 9. The resulting product is a hard rubbery sheet having good resiliency, which is retained even at low temperatures, and good abrasion resistance.

Example 11

A series of experiments were made in accordance with the method of Example 8 but with varying proportions of allene. The butadiene content in these experiments was 7% by weight of the reaction mixture. The intrinsic viscosity in the absence of allene was about 2.6, as stated in Example 9. In the following the allene concentration is stated as parts per million, based on the total reaction mixture: with 4 parts per million allene the intrinsic viscosity was 2.04; with 21 parts per million the intrinsic viscosity was 2.19; with 42 parts per million the intrinsic viscosity was 1.64; with 84 parts per million the intrinsic viscosity was 1.78; with 127 parts per million the intrinsic viscosity was 1.67, with 317 parts per million the intrinsic viscosity was 0.93; with 635 parts per million the intrinsic viscosity was 0.88.

Example 12

The procedure of Example 8 is repeated, substituting for the catalyst solution thereof 5 parts of benzene solution of catalyst prepared by reacting 18 parts $CoCl_2$ (anhydrous) with 9 parts aluminum triisobutyl in 300 parts benzene. The resulting polymer has a cis-1,4 content in excess of 95% and an intrinsic viscosity in toluene of the order of 1.5. The product is easily formed into a rubber as in Example 10.

Example 13

The procedure of Example 8 is repeated, substituting for the catalyst solution thereof 10 parts of a benzene solution of a catalyst prepared by reacting 18 parts of anhydrous nickel chloride with 9 parts of aluminum triethyl in 300 parts of benzene. The polymer has a cis-1,4 content of about 95%. Intrinsic viscosity in toluene is less than 1.5. The product is easily formed into a rubber.

Example 14

The procedure of Example 8 is repeated, substituting 15 parts of dry isoprene for the butadiene. Infrared analysis indicates the resulting polyisoprene polymer has a high cis-1,4 structure and a low viscosity.

One hundred parts of the polyisoprene prepared as above is mixed and milled with 2 parts phenyl-beta-naphthylamine, 5 parts zinc oxide, 3 parts stearic acid, 50 parts High Abrasion Furnace Black, 1.5 parts of N-cyclohexyl-2-benzothiazole-sulfenamide and 0.2 part sulfur and the product cured for 25 minutes at 135° C. The resulting product is a hard, rubbery sheet having good resiliency and good abrasion resistance.

Example 15

Examples 1, 5, 6, 8, 12 and 13 are repeated with the exception that the monomer employed is a mixture of 90 parts of butadiene and 10 parts of isoprene. The resulting products have low molecular weights and high cis-1,4 structure.

We claim as our invention:

1. In the process for polymerizing purified conjugated diolefins of 4 to 9 carbon atoms per molecule in substantially anhydrous solution at a temperature between 0° and 100° C. in the presence of from about $10^{-5}$ to about $10^{-1}$ mol, per mol of conjugated diene, of a catalyst from the group consisting of dissolved compounds of divalent nickel and cobalt, and a cocatalyst of the group consisting of aluminum trialkyls, aluminum alkyl halides and alkyl aluminum hydrides, the improvement which comprises conducting the polymerization in the presence of a controlled molecular weight suppressing amount of added allene in the range from 1 to 3000 parts per million parts of conjugated diolefin.

2. In the process for polymerizing purified butadiene in substantially anhydrous solution at a temperature between 15° and 60° C. in the presence of a catalyst comprising the dissolved reaction product of cobaltous chloride, aluminum chloride and an aluminum alkyl selected from the group consisting of aluminum trialkyls, aluminum alkyl halides and alkyl aluminum hydrides, in which the concentration of aluminum chloride is at least twice the concentration of cobaltous chloride, the latter is present in an amount in the range from about $10^{-5}$ to about $10^{-1}$ mol, per mol of butadiene, and the ratio of aluminum alkyl to cobaltous chloride is between 1:1.5 and 1000:1, the improvement which comprises conducting the polymerization in the presence of a controlled, molecular weight suppressing amount of added allene in the range from 1 to 3000 parts per million parts of butadiene.

3. A process according to claim 2 wherein said aluminum alkyl is aluminum alkyl sesquichloride.

4. A process according to claim 2 wherein said aluminum alkyl is aluminum triisobutyl.

5. In the process for polymerizing purified butadiene in substantially anhydrous solution at a temperature between 15° and 60° C. in the presence of a catalyst comprising the dissolved reaction product of cobaltous chloride, aluminum chloride and an aluminum alkyl selected from the group consisting of aluminum trialkyls, aluminum alkyl halides and alkyl aluminum hydrides in which the concentration of aluminum chloride is at least twice the concentration of cobaltous chloride, the latter is present in an amount in the range from about $10^{-5}$ to about $10^{-1}$ mol, per mol of butadiene, and the ratio of aluminum alkyl to cobaltous chloride is between 1:1.5 and 1000:1, the improvement which comprises conducting the polymerization in the presence of a controlled, molecular weight suppressing amount of added dimethyl acetylene in the range from 5 to 200 parts per million parts of butadiene.

6. A process for polymerizing butadiene which comprises treating a feed containing butadiene in technical purity to remove therefrom impurities which tend to affect the polymerization reaction, including acetylenic compounds and allene, and contacting the purified feed in substantially anhydrous solution at a temperature between 15° and 60° C. in the presence of from 1 to 3000 parts of added allene per million parts of butadiene with a catalyst comprising the dissolved reaction product of cobaltous chloride, aluminum chloride and an aluminum alkyl of the group consisting of aluminum trialkyls, aluminum alkyl halides and alkyl aluminum hydrides in which the concentration of aluminum chloride is at least twice the concentration of cobaltous chloride, the latter is present in an amount in the range from about $10^{-5}$ to $10^{-1}$ mol, per mol of butadiene, and the ratio of aluminum alkyl to cobaltous chloride is between 1:1.5 and 1000:1, and recovering polybutadiene having a high cis-1,4 structure and a workable molecular weight.

7. A process for polymerizing butadiene which comprises treating a feed containing butadiene in technical purity to remove therefrom impurities which tend to affect the polymerization reaction, including acetylenic compounds and allene, and contacting the purified feed in substantially anhydrous solution at a temperature between 15° and 60° C. in the presence of 5 to 200 parts of added dimethylacetylene per million parts of butadiene with a catalyst comprising the dissolved reaction product of cobaltous chloride, aluminum chloride and an aluminum alkyl of the group consisting of aluminum trialkyls, aluminum alkyl halides and alkyl aluminum hydrides in which the concentration of aluminum chloride is at least twice the concentration of cobaltous chloride, the latter is present in an amount in the range from about $10^{-5}$ to $10^{-1}$ mol, per mol of butadiene, and the ratio of aluminum alkyl to cobaltous chloride is between 1:1.5 and 1000:1, and recovering polybutadiene having a high cis-1,4 structure and a workable molecular weight.

8. In the process for polymerizing purified conjugated diolefins of 4 to 9 carbon atoms per molecule in substantially anhydrous solution at a temperature between 0° C. and 100° C. in the presence of from about $10^{-5}$ to about $10^{-1}$ mol, per mol of conjugated diolefin, of a catalyst from the group consisting of dissolved compounds of divalent nickel and cobalt, and a cocatalyst of the group consisting of aluminum trialkyls, aluminum alkyl halides and alkyl aluminum hydrides, the improvement which comprises conducting the polymerization in the presence of a controlled molecular weight suppressing amount of added dimethylacetylene in the range of from 5 to 200 parts per million parts of conjugated diolefin.

References Cited in the file of this patent

UNITED STATES PATENTS

| | | |
|---|---|---|
| 2,898,327 | McCulloch | Aug. 4, 1959 |
| 2,935,540 | Wolfe | May 3, 1960 |
| 2,953,554 | Miller | Sept. 20, 1960 |
| 2,953,556 | Wolfe | Sept. 20, 1960 |
| 2,970,134 | Anderson | Jan. 31, 1961 |
| 2,977,349 | Brockway | Mar. 28, 1961 |

FOREIGN PATENTS

| | | |
|---|---|---|
| 543,292 | Belgium | June 2, 1956 |